(12) United States Patent
Gomi (10) Patent No.: US 10,900,833 B2
(45) Date of Patent: Jan. 26, 2021

(54) SPECTRAL REFLECTOMETER

(71) Applicant: Seiko Epson Corporation, Tokyo (JP)

(72) Inventor: Tsugio Gomi, Fujimi (JP)

(73) Assignee: Seiko Epson Corporation

( * ) Notice: Subject to any disclaimer, the term of this patent is extended or adjusted under 35 U.S.C. 154(b) by 132 days.

(21) Appl. No.: 16/202,619

(22) Filed: Nov. 28, 2018

(65) Prior Publication Data

US 2019/0162594 A1 May 30, 2019

(30) Foreign Application Priority Data

Nov. 29, 2017 (JP) ................. 2017-228720

(51) Int. Cl.
*G01J 3/26* (2006.01)
*G01N 21/27* (2006.01)
(Continued)

(52) U.S. Cl.
CPC ............... *G01J 3/26* (2013.01); *G01J 3/0278* (2013.01); *G01J 3/0291* (2013.01); *G01J 3/0297* (2013.01); *G01J 3/10* (2013.01); *G01N 21/251* (2013.01); *G01N 21/272* (2013.01); *G01N 21/31* (2013.01); *G01N 21/474* (2013.01); *G01J 2003/262* (2013.01); *G01J 2003/265* (2013.01);
(Continued)

(58) Field of Classification Search
CPC ...... G01J 3/0278; G01J 3/0291; G01J 3/0297; G01J 3/10; G01J 3/102; G01J 3/26; G01J 2003/102; G01J 2003/104; G01J 2003/262; G01J 2003/265; G01N 21/251; G01N 21/2558; G01N 21/31; G01N 21/474; G01N 2021/3181; G01N 2021/4757; G01N 2021/4759
See application file for complete search history.

(56) References Cited

U.S. PATENT DOCUMENTS

| 5,206,708 A * | 4/1993 | Knapp ............... G01J 3/26 356/416 |
| 2003/0169421 A1* | 9/2003 | Ehbets ............ G01J 3/0278 356/328 |

(Continued)

FOREIGN PATENT DOCUMENTS

| JP | 2006-227012 A | 8/2006 |
| JP | 2009-236486 A | 10/2009 |

(Continued)

*Primary Examiner* — Michael A Lyons
(74) *Attorney, Agent, or Firm* — Harness, Dickey & Pierce, P.L.C.

(57) ABSTRACT

A spectral reflectometer includes a first substrate, a first light emitting element and a second light emitting element in which a height of a first light emitting portion which is the height from the first substrate to a first light emitting portion of the first light emitting element, which is installed on the first substrate and a height of a second light emitting portion which is the height from the first substrate to a second light emitting portion of the second light emitting element are different, and a light receiver that receives light, in which the second light emitting element having a high height of the second light emitting portion is installed at a position close to an optical axis of the light received by the light receiver from the first light emitting element having a low height of the first light emitting portion.

10 Claims, 8 Drawing Sheets

(51) Int. Cl.
    *G01N 21/47*      (2006.01)
    *G01N 21/31*      (2006.01)
    *G01J 3/02*       (2006.01)
    *G01J 3/10*       (2006.01)
    *G01N 21/25*      (2006.01)
    *G02B 6/293*      (2006.01)

(52) U.S. Cl.
    CPC .............. *G01N 2021/3181* (2013.01); *G01N 2021/4757* (2013.01); *G01N 2021/4759* (2013.01); *G02B 6/29358* (2013.01)

(56) References Cited

U.S. PATENT DOCUMENTS

| | | | |
|---|---|---|---|
| 2006/0192957 A1* | 8/2006 | Frick | G01J 3/10 356/328 |
| 2006/0193512 A1 | 8/2006 | Orelli et al. | |
| 2009/0242803 A1 | 10/2009 | Imura | |
| 2012/0133948 A1* | 5/2012 | Funamoto | G01J 3/027 356/451 |
| 2013/0256534 A1* | 10/2013 | Micheels | G01N 21/3577 250/339.07 |
| 2016/0011052 A1* | 1/2016 | Frick | G01J 3/524 356/402 |
| 2016/0282182 A1 | 9/2016 | Kanai | |
| 2019/0003963 A1* | 1/2019 | Amamiya | G01N 21/474 |
| 2020/0041343 A1* | 2/2020 | Gomi | G01J 3/0291 |

FOREIGN PATENT DOCUMENTS

| | | |
|---|---|---|
| JP | 2016-138749 A | 8/2016 |
| JP | 2016-186472 A | 10/2016 |

* cited by examiner

SPECTRAL REFLECTOMETER

BACKGROUND

1. Technical Field

The present invention relates to a spectral reflectometer.

2. Related Art

A spectral reflectometer that irradiates an object to be measured with light and analyzes reflected light to measure a spectral spectrum is utilized. A spectral reflectometer is disclosed in JP-A-2016-138749. According thereto, the spectral reflectometer is provided with two types of light emitting elements. One is a first light emitting element that emits visible light, and the other is a second light emitting element that emits light having a wavelength of less than 400 nm. By irradiating the object to be measured with light having a plurality of frequencies, it is possible to radiate light suitable for analysis.

The spectral reflectometer is provided with a light receiving portion. The light receiving portion is provided with a light receiving element and a wavelength tunable optical filter. The light receiving portion has an optical axis indicating a direction of high sensitivity in a light receiving sensitivity distribution, and the object to be measured is disposed on the optical axis. The angle between the line connecting the first light emitting element and the object to be measured and the optical axis is 45 degrees. The second light emitting element emits light toward a concave mirror. The light emitted from the second light emitting element is reflected by the concave mirror to irradiate the object to be measured from multiple directions.

Light that intersects an optical axis at an angle of 45 degrees, such as light emitted from a first light emitting element, is radiated on an object to be measured. At this time, since reflected light excluding regular reflection advances to a light receiving portion, it is possible to obtain light suitable for detecting the reflection spectrum of the object to be measured. The light emitted from a second light emitting element is radiated on the object to be measured with light intersecting the optical axis of the light receiving portion at an unspecified angle. Therefore, the distribution of the light reflected on the object to be measured is different from the distribution of the light emitted from the first light emitting element. In this manner, light radiation conditions are different for each light emitting element, thereby lowering the measurement accuracy of the spectrum of the light detected by the light receiving portion. When light is radiated from the plurality of light emitting elements, it is possible to suppress the influence of light radiated from each light emitting element by irradiating the object to be measured at the same incident angle. Therefore, there has been a demand for a spectral reflectometer that radiates light with high accuracy of the angle of light radiated on the object to be measured from a plurality of light emitting elements.

SUMMARY

An advantage of some aspects of the invention is to solve at least a part of the problems described above, and the invention can be implemented as the following forms or application examples.

Application Example 1

A spectral reflectometer according to this application example includes a substrate, a plurality of types of light emitting elements that are installed on the substrate and have different heights of light emitting portions, which are the heights from the substrate to the light emitting portions, and a light receiver that receives light, in which the light emitting element having a high height of the light emitting portion is installed at a position close to an optical axis of the light received by the light receiver from the light emitting element having a low height of the light emitting portion.

According to this application example, the spectral reflectometer is provided with a substrate. A plurality of types of light emitting elements are installed on the substrate. The heights of the light emitting portions, which is the heights from the substrate to the light emitting portions, of the plurality of types of light emitting elements are different. Further, the spectral reflectometer is provided with a light receiver. The light emitted from the light emitting element is radiated on the object to be measured, and the light receiver receives the light reflected by the object to be measured.

The optical axis of the light to be received is set in the light receiver. The light receiver receives the light incident along the optical axis. The light emitting element having a high height of light emitting portion is installed at a position close to the optical axis of the light received by the light receiver from the light emitting element having a low height of the light emitting portion. The light emitting portion of the light emitting element having a high height of the light emitting portion is close to the object to be measured. This light emitting element is close to the optical axis of the light receiver. The light emitting portion of the light emitting element having a low height of the light emitting portion is separated from the object to be measured. This light emitting element is separated from the optical axis of the light receiver. In this manner, in a case where light emitting elements having different heights of the light emitting portions coexist, the angle formed by the straight line connecting the light emitting portion of each type of light emitting elements and the object to be measured with the optical axis of the light receiver may be brought close to the same angle by making the distance between the optical axis of each light receiver and the light emitting portion of the light emitting element different from each other. As a result, the spectral reflectometer may radiate the light with a high degree of accuracy of the angle of the light radiated on the object to be measured from the plurality of light emitting elements.

Application Example 2

In the spectral reflectometer according to the application example described above, angles formed by light traveling to an object to be measured, which is on an optical axis of light received by the light receiver, the light sent from the light emitting portions of the plurality of types of the light emitting elements and the optical axis are the same as each other.

According to this application example, the light receiver has an optical axis of light to be received. The light emitted from the plurality of types of light emitting elements has the same angle between the light traveling to the object to be measured on the optical axis and the optical axis of the light receiver. At this time, when the light receiver receives the light radiated on the object to be measured, the light radiated from the plurality of types of light emitting elements may be received in the same reflection state.

Application Example 3

In the spectral reflectometer according to the application example described above, an angle formed by light traveling from the light emitting portions of the plurality of types of the light emitting elements to the object to be measured on the optical axis and the optical axis is 45 degrees.

According to this application example, the light emitted from the plurality of types of light emitting elements has an angle of 45 degrees between the light traveling to the object to be measured and the optical axis of the light received by the light receiver. At this time, the light receiver may receive the light excluding a regular reflected component of the light reflected by the object to be measured.

Application Example 4

In the spectral reflectometer according to the application example described above, a lens is provided at a position facing the light emitting element.

According to this application example, the spectral reflectometer is provided with a lens at a position facing the light emitting element. The lens may efficiently condense and radiate the light radiated by the light emitting element on the object to be measured.

Application Example 5

In the spectral reflectometer according to the application example described above, an opening portion is provided between the light emitting element and the object to be measured on the optical axis.

According to this application example, the spectral reflectometer is provided with an opening portion between a light emitting element and an object to be measured on an optical axis of a light receiver. At this time, only the light passing through the opening portion is radiated on the object to be measured. Therefore, it is possible to further limit the angle of light traveling from the light emitting portion of the light emitting element to the object to be measured.

Application Example 6

In the spectral reflectometer according to the application example described above, the light emitting element is provided with a light-transmissive protection portion on the side on which light is emitted.

According to this application example, the spectral reflectometer is provided with a light-transmissive protection portion on a side where the light emitting element emits light. Dust and moisture particles may float in the vicinity of the object to be measured in some cases. At this time, the protection portion may suppress dust and moisture particles adhering to the light emitting element and the light receiver.

Application Example 7

In the spectral reflectometer according to the application example described above, the protection portion is a filter that limits a wavelength of light to be passed.

According to this application example, the protection portion is a filter that limits the wavelength of the light to be passed. At this time, the protection portion may suppress the light other than the wavelength to be received by the light receiver advancing to the light receiver.

Application Example 8

In the spectral reflectometer according to the application example described above, the protection portion may be detachably installed.

According to this application example, the protection portion is detachably installed. Therefore, even when dust or moisture particles adhere to the protection portion, it is possible to remove the protection portion from the spectral reflectometer and wipe off the dust and moisture particles. Then, it is possible to reinstall the cleaned protection portion in the spectral reflectometer.

Application Example 9

In the spectral reflectometer according to the application example described above, the plurality of types of the light emitting elements may consist of three or more types of light emitting elements having different wavelength distributions for emitting light.

According to this application example, the plurality of types of light emitting elements consist of three or more types of light emitting elements that emit light having different wavelength distributions. The wavelength distribution of the light emitted from one type of light emitting element is often limited in a wavelength range. Also at this time, it is possible to irradiate to the object to be measured with light having a wavelength distribution close to natural light by irradiating the object to be measured with light from three or more types of light emitting elements having different wavelength distributions.

Application Example 10

In the spectral reflectometer according to the application example described above, the light receiver may include a wavelength tunable Fabry-Perot etalon.

According to this application example, the light receiver includes a wavelength tunable Fabry-Perot etalon. The wavelength tunable Fabry-Perot etalon is a compact wavelength tunable filter. Therefore, even when the light receiver receives light of a specific wavelength, it is possible to downsize the light receiver.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments will be described with reference to drawings. In order to make each member in each drawing to be recognizable to each figure, the scale of each member is shown differently.

First Embodiment

Figure 1:
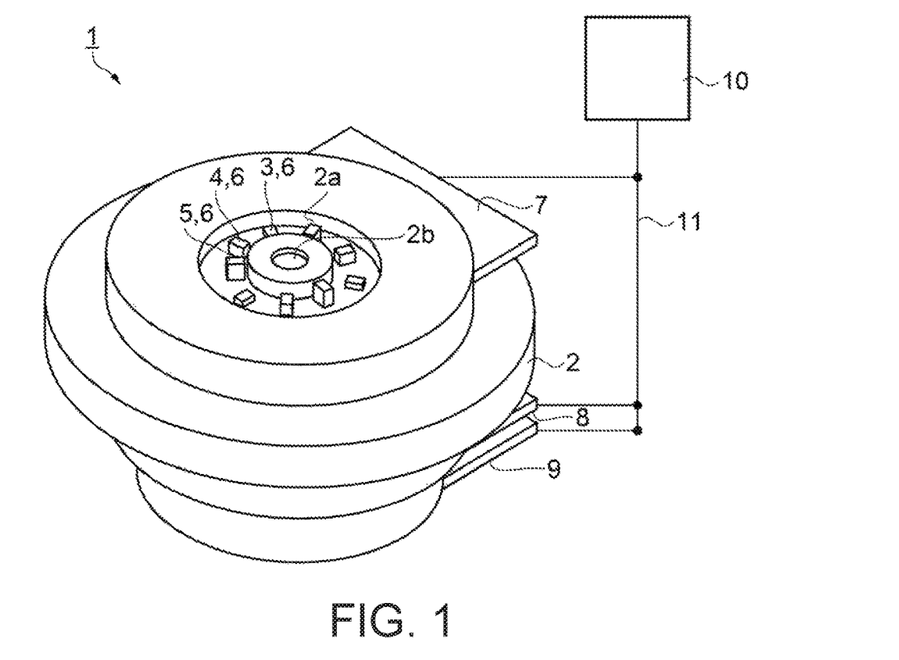
FIG. 1 is a schematic perspective view showing a structure of a spectral reflectometer according to a first embodiment.

In the present embodiment, a characteristic example of the spectral reflectometer will be described with reference to drawings. A spectral reflectometer according to a first embodiment will be described with reference to FIGS. 1 to 8. FIG. 1 is a schematic perspective view showing a structure of the spectral reflectometer. As shown in FIG. 1, a spectral reflectometer 1 has a cylindrical housing 2. A first opening portion 2a is installed in the housing 2, and a first light emitting element 3, a second light emitting element 4, and a third light emitting element 5 are exposed in the first opening portion 2a. The first light emitting element 3, the second light emitting element 4, and the third light emitting element 5 are light emitting elements 6 having different external shapes. The light emitting element 6 irradiates an object to be measured with light (not shown). A second opening portion 2b is installed near the axis of the cylindrical housing 2. The spectral reflectometer 1 detects light having passed through the second opening portion 2b among the light reflected by the object to be measured.

It is preferable that a plurality of types of light emitting elements 6 consist of three or more types of light emitting elements 6 emitting different wavelength distributions. In order to perform colorimetry, it is preferable to irradiate the object to be measured with light having a wavelength in the entire visible light range. The wavelength distribution of the light emitted from one type of light emitting element 6 is often limited in a wavelength range. Also at this time, it is possible to irradiate the object to be measured with light having a wavelength distribution close to natural light by irradiating the object to be measured with light from three or more types of light emitting elements 6 having different wavelength distributions. Therefore, it is preferable to install the light emitting elements 6 having three or more wavelength distributions.

The configuration of each light emitting element 6 is not particularly limited, but in the embodiment, for example, the first light emitting element 3 is a white light emitting diode (LED). The second light emitting element 4 is an ultraviolet LED. In the second light emitting element 4, the peak wavelength of luminance exists at 400 nm or less. The third light emitting element 5 is a blue LED. In the third light emitting element 5, the peak wavelength of luminance exists from 400 nm to 420 nm. When radiated from the first light emitting element 3, the second light emitting element 4, and the third light emitting element 5 at the same time, light close to natural light may be emitted. The light emitting element 6 may emit light at one point or may emit light at the surface. Alternatively, a lens may be installed in a position to emit light. The position where the light is radiated most strongly is a light emitting portion.

A first substrate 7, a second substrate 8, and a third substrate 9 as substrates protrude from the side surface of the cylindrical housing 2. A first substrate 7, a second substrate 8, and a third substrate 9 are electrically connected to a control unit 10 through a wiring 11.

Figure 2:
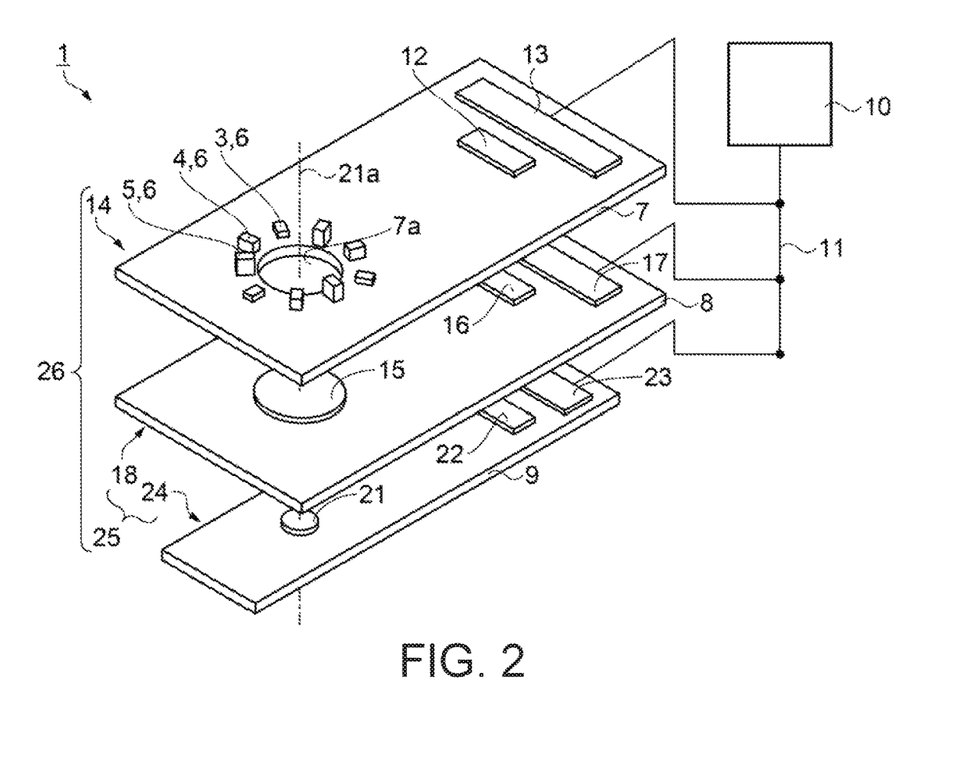
FIG. 2 is a schematic perspective view showing a configuration of a substrate.

FIG. 2 is a schematic perspective view showing a structure of the substrates, in which the housing 2 is removed from the spectral reflectometer 1. As shown in FIG. 2, the first light emitting element 3, the second light emitting element 4, and the third light emitting element 5 are installed on the first substrate 7. A hole 7a is installed on the first substrate 7, and the first light emitting element 3, the second light emitting element 4, and the third light emitting element 5 are installed surrounding the hole 7a.

On the first substrate 7, a switch circuit 12 and a first connector 13 are installed. The first light emitting element 3, the second light emitting element 4, and the third light emitting element 5 are electrically connected to the switch circuit 12 through wirings (not shown). Further, the switch circuit 12 is electrically connected to the first connector 13. The first connector 13 is electrically connected to the control unit 10 through the wiring 11.

Surface-mount type LEDs are used for the first light emitting element 3, the second light emitting element 4, and the third light emitting element 5. Surface-mount type LEDs are smaller than filament lamps and cannonball type LEDs. Therefore, it is possible to downsize the spectral reflectometer 1 by using the surface-mount type LEDs. In addition, since the surface-mount type LEDs may be mounted in the same process as a chip resistor and a chip transistor, it is possible to mount the LEDs on the first substrate 7 with high productivity.

The control unit 10 outputs power and control signals to the switch circuit 12. The control signal is a signal for instructing turning on and off of the light emitting element 6. The switch circuit 12 supplies power to the light emitting element 6 when inputting a control signal for instructing turning on of the light emitting element 6. The switch circuit 12 stops supplying power to the light emitting element 6 when inputting a control signal for instructing turning off of the light emitting element 6. Therefore, the light emitting element 6 performs turning on and off in accordance with a control signal output from the control unit 10. The first substrate 7, the light emitting element 6, the switch circuit 12, and the like constitute a light source unit 14.

On the second substrate 8, a wavelength tunable filter 15, a filter driving circuit 16, and a second connector 17 are installed. The wavelength tunable filter 15 is electrically connected to the filter driving circuit 16 through a wiring (not shown). The filter driving circuit is electrically connected to the second connector 17 through a wiring (not shown). The wavelength tunable filter is a wavelength tunable Fabry-Perot etalon. The wavelength tunable Fabry-Perot etalon is the compact wavelength tunable filter 15. Therefore, it is possible to downsize the spectral reflectometer 1. The filter driving circuit 16 is a circuit that drives the wavelength tunable filter 15. The filter driving circuit 16 controls the wavelength of the light passing through the wavelength tunable filter 15.

The filter driving circuit 16 is electrically connected to the second connector 17. The second connector 17 is electrically connected to the control unit 10 through the wiring 11. The control unit 10 outputs a control signal to the filter driving circuit 16. The control signal is a signal indicating the wavelength of the light to be passed through the wavelength tunable filter 15. The filter driving circuit 16 controls the wavelength to be passed through the wavelength tunable filter 15 in accordance with the control signal. The wavelength tunable filter 15, the filter driving circuit 16, the second substrate 8, and the like constitute a filter unit 18.

On the third substrate 9, a light receiving element 21, a light receiving element driving circuit 22, and a third connector 23 are installed. The light receiving element 21 is electrically connected to the light receiving element driving circuit 22. The light receiving element driving circuit 22 is electrically connected to the third connector 23. The third connector 23 is electrically connected to the control unit 10 through the wiring 11. The light receiving element 21 detects the intensity of the incident light. Then, the light receiving element 21 outputs a voltage signal corresponding to the intensity of the light. For the light receiving element 21, a silicon photodiode or a photo integrated circuit (IC) may be used. The light receiving element driving circuit 22 is a circuit that drives the light receiving element 21. The light receiving element driving circuit 22 supplies electric power to the light receiving element 21, receives the voltage signal output from the light receiving element 21, and converts the voltage signal into a digital signal. Then, the light receiving element driving circuit 22 outputs a digital signal indicating the intensity of light to the control unit 10. The control unit 10 inputs the digital signal output from the light receiving element driving circuit 22 in accordance with the timing at which adjustment of the wavelength of the light to be passed through the wavelength tunable filter 15 is completed. Therefore, the control unit 10 may detect the intensity of light of a specific wavelength with good quality.

The light receiving element 21, the light receiving element driving circuit 22, the third substrate 9, and the like consists of a light receiving unit 24. The filter unit 18 and the light receiving unit 24 constitute a light receiver 25. Since the filter unit 18 is provided with a wavelength tunable Fabry-Perot etalon, the light receiver 25 includes a wavelength tunable Fabry-Perot etalon. The light receiver 25 and the light source unit 14 constitute a sensor unit 26.

The light receiving element 21 has an optical axis 21a showing a direction of high sensitivity in a light receiving sensitivity distribution. The hole 7a and the wavelength tunable filter 15 are installed at positions through which the optical axis 21a passes.

Figure 3:
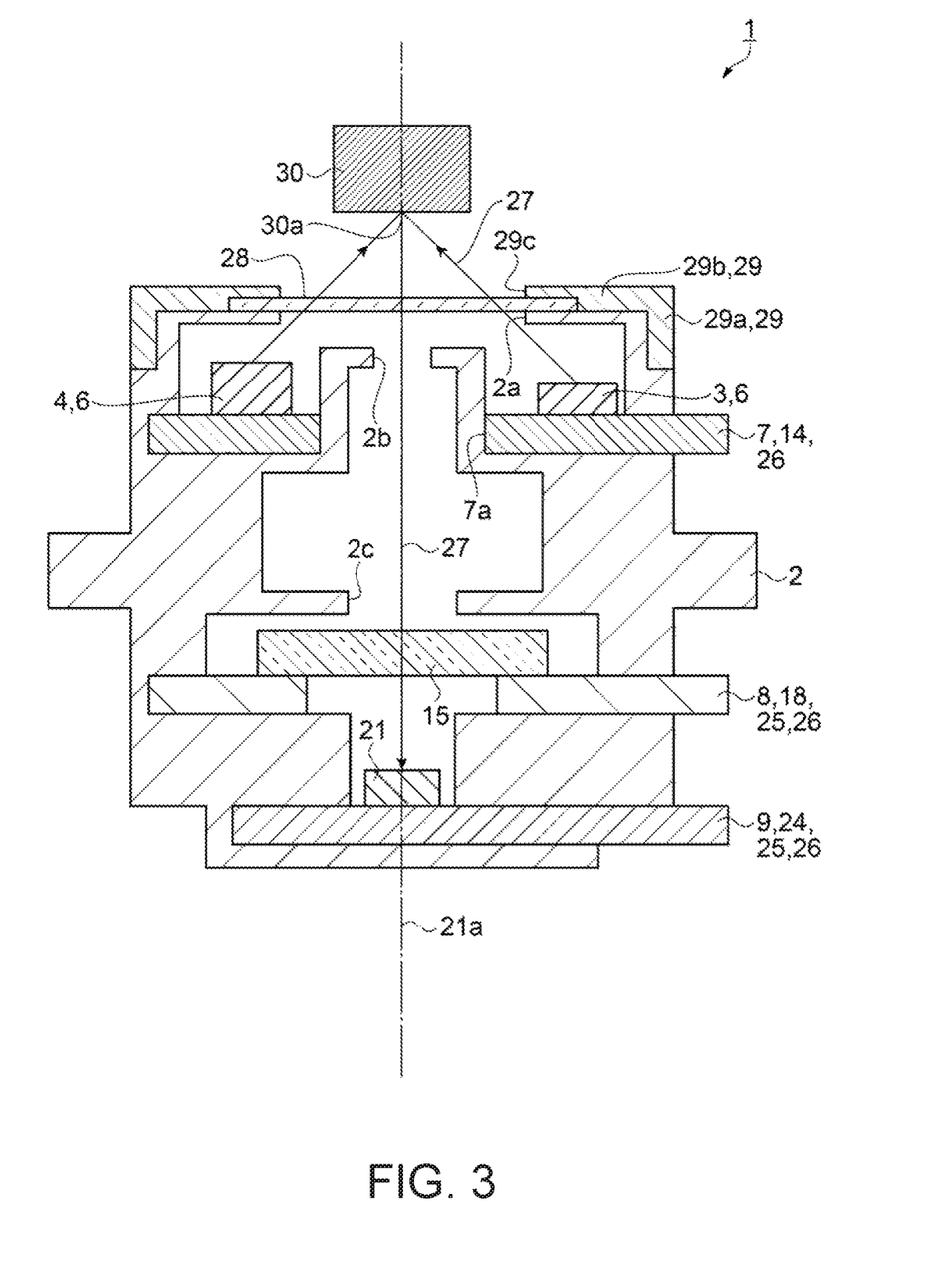
FIG. 3 is a schematic side sectional view showing a structure of a spectral reflectometer.

FIG. 3 is a schematic side sectional view showing a structure of the spectral reflectometer. As shown in FIG. 3, the first substrate 7, the second substrate 8, and the third substrate 9 are arranged at intervals in the direction of the optical axis 21a. A part of the housing 2 is installed between the first substrate 7 and the second substrate 8 and a part of the housing 2 is also installed between the second substrate 8 and the third substrate 9. The housing 2 has a structure in which a plurality of parts are assembled.

In the spectral reflectometer 1, a light-transmissive protection portion 28 is installed on the side from which the light emitting element 6 emits light 27. At this time, the light emitting element 6 emits the light 27 toward an object 30 to be measured. The protection portion 28 is located between the light emitting element 6 and the object 30 to be measured. Dust and moisture particles may float in the vicinity of the object 30 to be measured in some cases. At this time, the protection portion 28 may suppress dust and moisture particles adhering to the light emitting element 6 and the light receiver 25.

The protection portion 28 is a filter that limits the wavelength of the light 27 to be passed. For example, when the spectral reflectometer 1 performs spectral reflection measurement in the wavelength region of visible light, a filter for passing the light 27 limited to the wavelength region of visible light is used for the protection portion 28. The wavelength characteristic of the light 27 transmitted by the protection portion 28 is not particularly limited, but in the embodiment, for example, the protection portion 28 transmits the light 27 having a wavelength of 350 nm to 700 nm. Then, the protection portion 28 makes the light 27 having a wavelength less than 350 nm and the light 27 having a wavelength exceeding 700 nm non-transmissive. Thereby, the protection portion 28 may suppress the light 27 other than the wavelength to be received by the light receiver 25 advancing to the light receiver 25. Since the light 27 other than the wavelength to be measured, such as near-infrared light, is a noise component, the protection portion 28 does not allow the near-infrared light 27 to pass therethrough, and therefore it is possible to perform highly accurate measurement.

The protection portion 28 is adhesively fixed to a support portion 29. The support portion 29 has a shape in which a cylindrical outer peripheral portion 29a and a disc-shaped top plate portion 29b are joined. An opening portion 29c is installed in the top plate portion 29b, and the protection portion 28 is installed in the opening portion 29c. The outer peripheral portion 29a is inserted in the housing 2 and may be removed from the housing 2. The protection portion 28 is detachably installed with the housing 2 by the support portion 29. Therefore, even when dust or moisture particles adhere to the protection portion 28, it is possible to remove the protection portion 28 from the spectral reflectometer 1 and wipe off the dust and moisture particles. Then, it is possible to reinstall the cleaned protection portion 28 in the spectral reflectometer 1. Therefore, it is possible to make maintenance of the protection portion 28 easier.

The spectral reflectometer 1 is used after placing the object 30 to be measured at a position on the optical axis 21a of the light receiving element 21. Further, the object 30 to be measured is disposed in a position where the distance from the protection portion 28 is a predetermined distance. The object 30 to be measured is irradiated with the light 27 emitted from the light emitting element 6. The light 27 is reflected diffusely on the surface of the object 30 to be measured. The surface of the object 30 to be measured on the optical axis 21a is set as an observation point 30a. The spectral reflectometer 1 analyzes the light 27 reflected at the observation point 30a.

A part of the light 27 reflected on the surface of the object 30 to be measured passes through the protection portion 28. The protection portion 28 removes infrared light. A part of the light 27 that has passed through the protection portion 28 reaches the wavelength tunable filter 15. The wavelength tunable filter 15 passes the light 27 of a specific wavelength. The wavelength of the light 27 to be passed is controlled by the control unit 10.

The second opening portion 2b and a third opening portion 2c are installed between the protection portion 28 and the wavelength tunable filter 15. The second opening portion 2b and the third opening portion 2c are part of the housing 2. The second opening portion 2b and the third opening portion 2c act as a throttle for advancing only the light 27 reflected by the object 30 to be measured to the light receiving element 21.

The light 27 that has passed through the wavelength tunable filter 15 is radiated on the light receiving element 21. Then, the light receiving element 21 detects the intensity of the radiated light 27 and outputs the light to the control unit 10. In this manner, the light receiver 25 receives the light 27.

Figure 4:
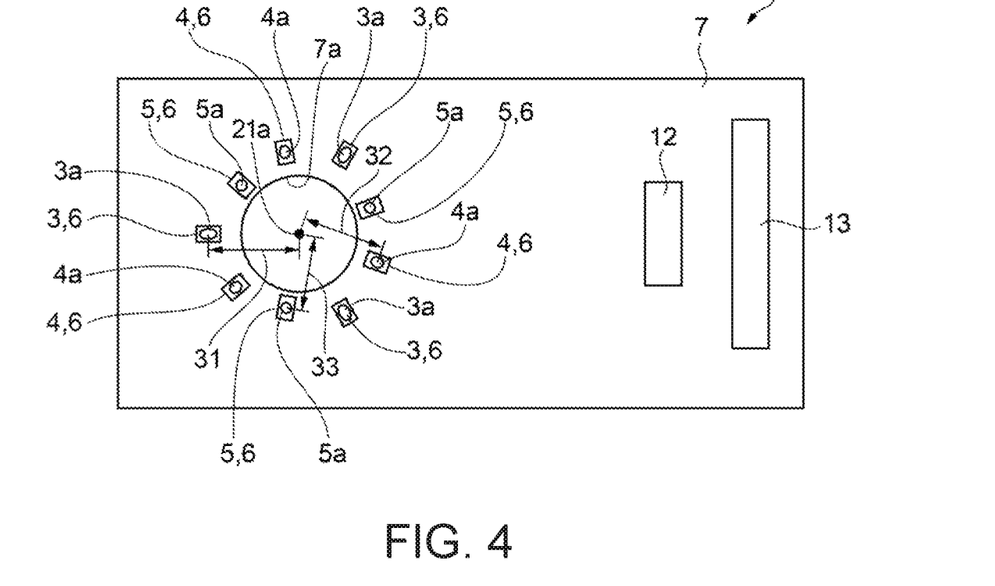
FIG. 4 is a schematic plan view showing a configuration of a light source unit.
Figure 5:
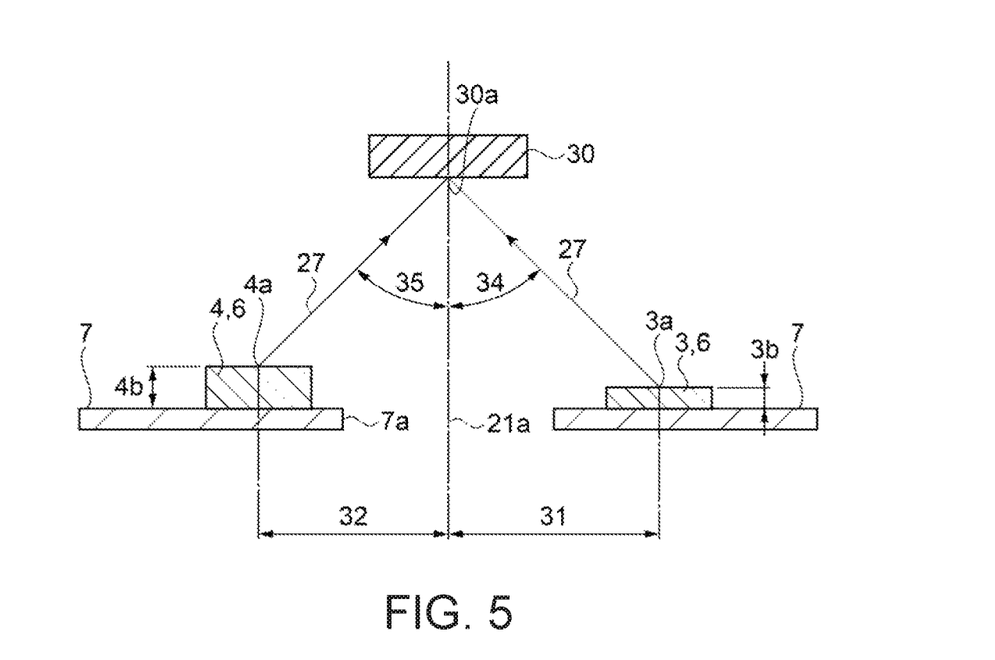
FIG. 5 is a schematic side sectional view for describing a relative position of a light emitting element.
Figure 6:
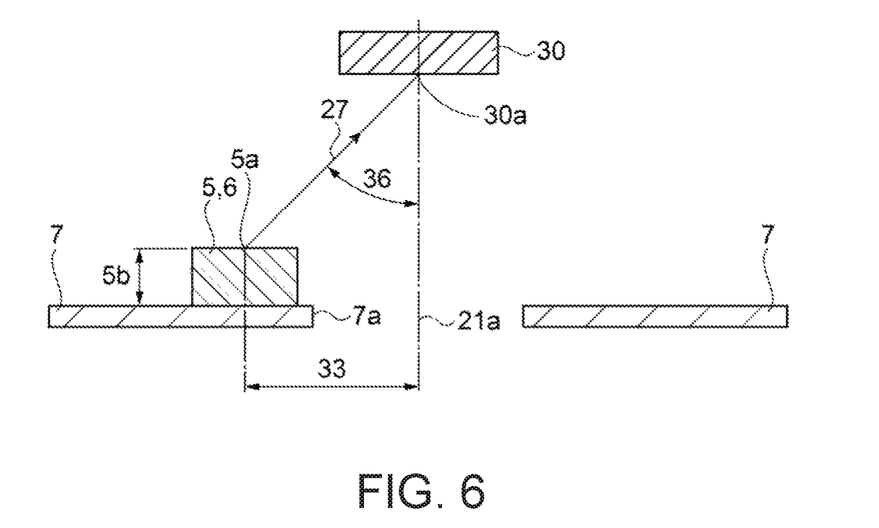
FIG. 6 is a schematic side sectional view for describing a relative position of a light emitting element.

FIG. 4 is a schematic plan view showing a configuration of the light source unit. FIGS. 5 and 6 are schematic side sectional views for describing relative positions of the light emitting elements. As shown in FIG. 4, three types of light emitting elements 6, namely, the first light emitting element 3, the second light emitting element 4, and the third light emitting element 5 are installed. That is, the plurality of types of light emitting elements 6 are installed on the first substrate 7. The portions where the first light emitting element 3, the second light emitting element 4, and the third light emitting element 5 emit light 27 are referred to as a first light emitting portion 3a, a second light emitting portion 4a, and a third light emitting portion 5a, respectively. The first light emitting portion 3a, the second light emitting portion 4a, and the third light emitting portion 5a correspond to light emitting portions.

Three first light emitting elements 3 are installed on the first substrate 7. In the first light emitting element 3, the distance between the optical axis 21a and the first light emitting portion 3a is a first distance 31. In the second light emitting element 4, the distance between the optical axis 21a and the second light emitting portion 4a is a second distance 32. In the third light emitting element 5, the distance between the optical axis 21a and the third light emitting portion 5a is a third distance 33.

On the first substrate 7, the first light emitting element 3, the second light emitting element 4, and the third light emitting element 5 are repeatedly arranged in the counter-clockwise direction around the optical axis 21a in this order. The angle formed by the adjacent light emitting elements 6 and the optical axis 21a is 40 degrees. Therefore, the light emitting elements 6 are arranged at equal angles.

When the surface of the object 30 to be measured has irregularities, the intensity or spectrum of the light reflected by the direction in which the light 27 is radiated differs. In the spectral reflectometer 1, since the first light emitting element 3, the second light emitting element 4, and the third light emitting element 5 respectively radiate the light 27 from three directions, even when the surface of the object 30 to be measured has irregularities, it is possible to improve the measurement accuracy of the spectrum detected by the spectral reflectometer 1.

The shape of the light emitting portion of the light emitting element 6 may be a flat surface, a point, a hemispherical shape, an ellipsoidal shape or the like, and the shape of the light emitting portion is various. For each type, the light emitting elements 6 are in the same arrangement with respect to the optical axis 21a. Thereby, even when a plurality of light emitting elements 6 of the same type are installed on the first substrate 7, it is possible to make the distribution of the light 27 that each light emitting element 6 irradiates the object 30 to be measured have a similar distribution.

As shown in FIGS. 5 and 6, the height from the first substrate 7 to the first light emitting portion 3a is set as a height 3b of the first light emitting portion as the height of the light emitting portion. The height from the first substrate 7 to the second light emitting portion 4a is set as a height 4b of the second light emitting portion as the height of the light emitting portion. The height 4b of the second light emitting portion is higher than the height 3b of the first light emitting portion. In this manner, the light emitting element 6 having the height 4b of the second light emitting portion different from the height 3b of the first light emitting portion is installed on the first substrate 7.

The second light emitting element 4 having the high height 4b of the second light emitting portion is installed at a position closer to the optical axis 21a than the first light emitting element 3 having the low height 3b of the first light emitting portion.

The height from the first substrate 7 to the third light emitting portion 5a is set as a height 5b of the third light emitting portion as the height of the light emitting portion. The height 5b of the third light emitting portion is higher than the height 4b of the second light emitting portion. In this manner, the light emitting element 6 having the height 5b of the third light emitting portion different from the height 3b of the first light emitting portion and the height 4b of the second light emitting portion is installed on the first substrate 7.

The third light emitting element 5 having the height 5b of the third light emitting portion is installed at a position closer to the optical axis 21a than the second light emitting element 4 having the lower height 4b of the second light emitting portion. The height 3b of the first light emitting portion, the height 4b of the second light emitting portion, and the height 5b of the third light emitting portion are set as the heights of the light emitting portions. At this time, the plurality of types of light emitting elements 6 having different heights of the light emitting portions are installed on the first substrate 7. The light emitting element 6 having a high height of the light emitting portion is installed at a position closer to the optical axis 21a of the light 27 received by the light receiver 25 than the light emitting element 6 having a low height of the light emitting portion.

In the light emitting element 6 having a high height of the light emitting portion, the light emitting portion is close to the object 30 to be measured. The light emitting portion of the light emitting element 6 having a high height of the light emitting portion is close to the optical axis 21a. The light emitting portion of the light emitting element 6 having a low height of the light emitting portion is separated from the object 30 to be measured. The light emitting element 6 is separated from the optical axis 21a. In this manner, in a case where light emitting elements 6 having different heights of the light emitting portions coexist, the angle formed by the straight line connecting the light emitting portion of each light emitting element 6 and the object 30 to be measured with the optical axis 21a may be brought close to the same angle by making the distance between the optical axis 21a of each light receiver 25 and the light emitting portion of the light emitting element 6 different from each other. As a result, the spectral reflectometer 1 may radiate the light 27 with a high degree of accuracy of the angle of the light 27 radiated on the object 30 to be measured from the plurality of light emitting elements 6.

The angle formed by the light 27 traveling from the first light emitting portion 3a of the first light emitting element 3 to the observation point 30a which is the object 30 to be measured on the optical axis 21a and the optical axis 21a is set as a first angle 34. The angle formed by the light 27 traveling from the second light emitting portion 4a of the second light emitting element 4 to the observation point 30a which is the object 30 to be measured on the optical axis 21a and the optical axis 21a is set as a second angle 35. The angle formed by the light 27 traveling from the third light emitting portion 5a of the third light emitting element 5 to the observation point 30a which is the object 30 to be measured on the optical axis 21a and the optical axis 21a is set as a third angle 36.

The first angle 34, the second angle 35, and the third angle 36 have the same angle. In other words, the angles formed by the light 27 traveling to the object 30 to be measured, which is on the optical axis 21a of the light 27 received by the light receiver 25, the light sent from the light emitting portions of the plurality of types of light emitting elements 6 and the optical axis 21a are the same each other. At this time, when the light receiver 25 receives the light 27 radiated on the object 30 to be measured, the light radiated from the plurality of types of light emitting elements 6 may be received in the same reflection state.

The first angle 34, the second angle 35, and the third angle 36 are 45 degrees. That is, the angle formed by the light 27 traveling from the light emitting portions of the plurality of types of light emitting elements 6 to the object 30 to be measured on the optical axis 21a and the optical axis 21a is 45 degrees. At this time, the light receiver 25 may receive the light 27 excluding the regular reflected component of the light reflected by the object 30 to be measured.

Figure 7:
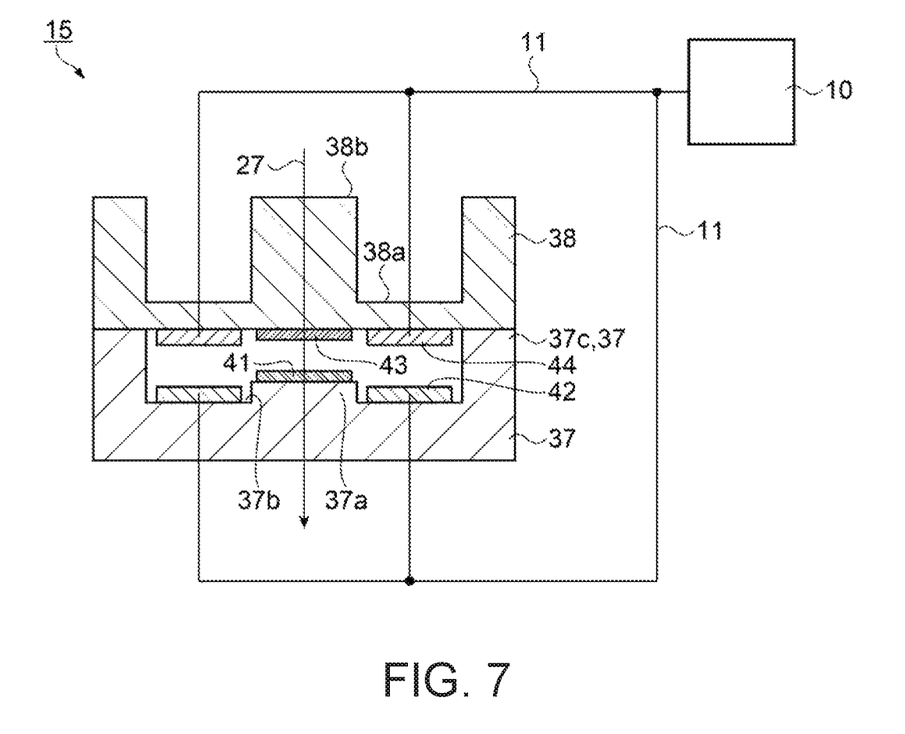
FIG. 7 is a schematic side sectional view showing a structure of a wavelength tunable filter.

FIG. 7 is a schematic side sectional view showing a structure of the wavelength tunable filter. As shown in FIG. 7, the wavelength tunable filter 15 is provided with a fixed substrate 37 and a movable substrate 38. The fixed substrate 37 has a rectangular plate shape. At the center of the fixed substrate 37, a reflective film installation portion 37a protruding in a cylindrical shape is installed. An annularly recessed electrode installation groove 37b surrounding the reflective film installation portion 37a is installed. A first joint portion 37c protruding toward the movable substrate 38 is installed around the electrode installation groove 37b. The first joint portion 37c is a portion joined to the movable substrate 38.

The material of the fixed substrate 37 is a material that transmits the light 27 but is not particularly limited so long as the material has strength. Silicate glass is used as the material of the fixed substrate 37.

A first reflective film 41 is installed in the reflective film installation portion 37a. A first electrode 42 is installed in the electrode installation groove 37b. The first electrode 42 has an annular shape.

An annular groove 38a surrounding the center is installed on the movable substrate 38. A cylindrical portion surrounded by the groove 38a is set as a movable portion 38b. The movable portion 38b is installed to face the reflective film installation portion 37a of the fixed substrate 37. Since the thickness of the movable substrate 38 is thin at the portion of the groove 38a, the movable portion 38b may easily move in the vertical direction in the figure. The material of the movable substrate 38 is a material that transmits the light 27.

A second reflective film 43 is installed on the surface of the movable portion 38b on the side of the fixed substrate 37. The first reflective film 41 and the second reflective film 43 are disposed to face each other. A second electrode 44 is installed on the surface of the movable substrate 38 on the fixed substrate 37 side. The first electrode 42 and the second electrode 44 are disposed to face to each other.

The first electrode 42 and the second electrode 44 are electrically connected to the control unit 10 through the wiring 11. The control unit 10 controls the voltage applied between the first electrode 42 and the second electrode 44. By changing the voltage between the first electrode 42 and the second electrode 44, the electrostatic force applied between the first electrode 42 and the second electrode 44 changes. The control unit 10 controls the distance between the first reflective film 41 and the second reflective film 43 by controlling the voltage applied between the first electrode 42 and the second electrode 44.

It is possible to control the half-value width of the wavelength of the light 27 to be transmitted through the first reflective film 41 and the second reflective film 43 by controlling the distance between the first reflective film 41 and the second reflective film 43. The thickness of the wavelength tunable filter 15 is 2 mm or less, and it is possible to downsize the spectral reflectometer 1 by using the wavelength tunable filter 15.

Figure 8:
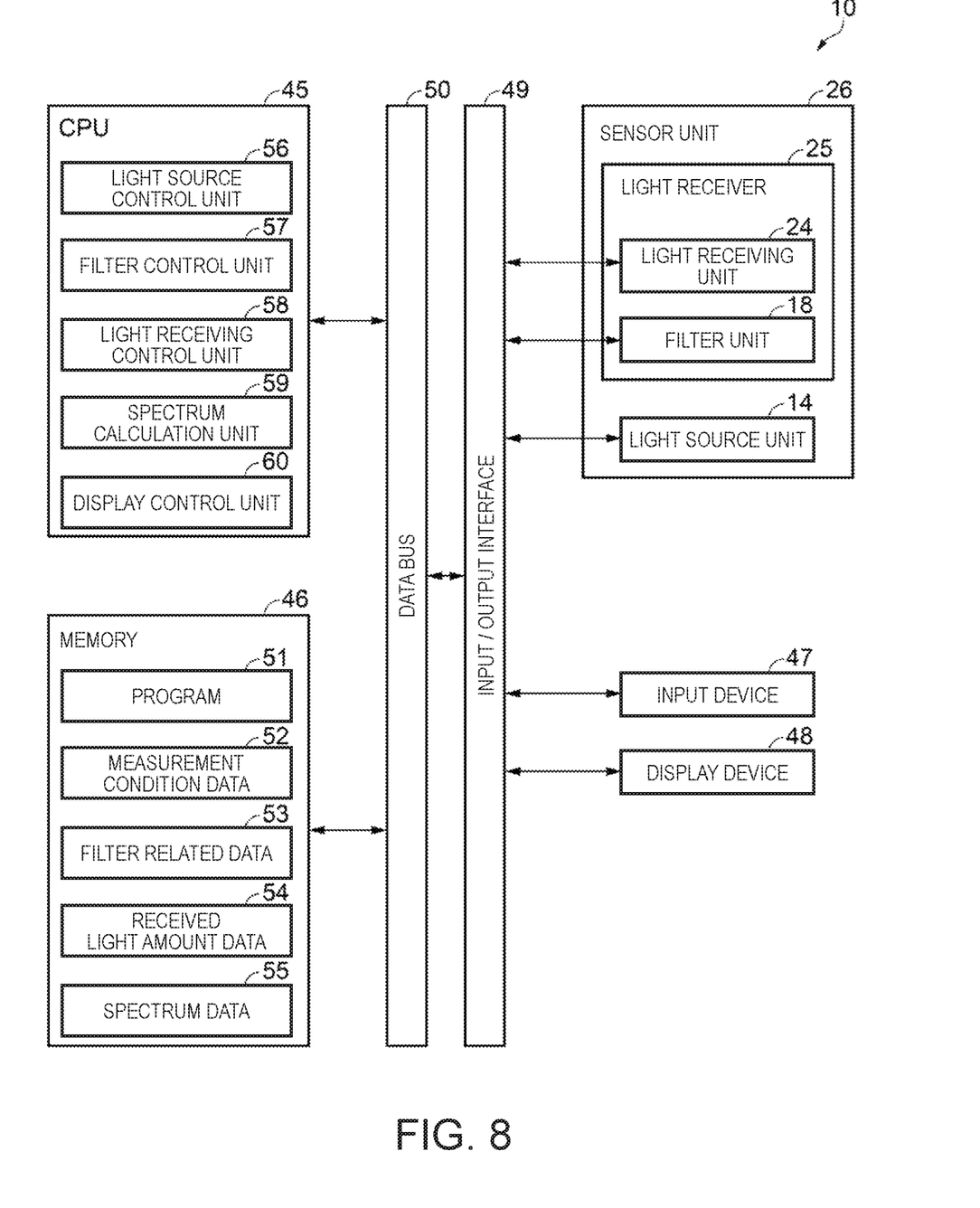
FIG. 8 is an electric control block view of a spectral reflectometer.

FIG. 8 is an electric control block view of the spectral reflectometer. In FIG. 8, the spectral reflectometer 1 is provided with the control unit 10 that controls the operation of the spectral reflectometer 1. The control unit 10 is provided with a central processing unit (CPU) 45 that performs various arithmetic processing as a processor and a memory 46 as a storage unit that stores various information. The light receiving unit 24, the filter unit 18, the light source unit 14, an input device 47, and a display device 48 are connected to the CPU 45 via an input/output interface 49 and a data bus 50.

The sensor unit 26 includes the light receiver 25 and the light source unit 14. The light receiver 25 includes the light receiving unit 24 and the filter unit 18. The light source unit 14 inputs an instruction signal from the CPU 45. The instruction signal includes information as to whether or not the light source unit 14 emits the light 27. Then, the light source unit 14 switches between emission and emission stoppage of the light 27 based on the instruction signal.

The filter unit 18 also inputs an instruction signal from the CPU 45. The instruction signal includes information on the wavelength of the light 27 that the filter unit 18 passes. Then, the filter unit 18 limits the light 27 having a wavelength to be passed based on the instruction signal.

The light receiving unit 24 also inputs an instruction signal from the CPU 45. The instruction signal includes information as to whether or not to output data indicating the intensity of the light 27 detected by the light receiving unit 24. The light receiving unit 24 converts the intensity of the light 27 detected based on the instruction signal into digital data and outputs the digital data to the CPU 45.

The input device 47 is a device such as a keyboard and a mouse. The input device 47 is a device for an operator to instruct the spectral reflectometer 1 about various instructions such as measurement start, measurement end, measurement conditions, and the like. The display device is a device that displays measurement results and information related to measurement. As the display device 48, a liquid crystal display device, an organic electroluminescence display, a plasma display, a surface electric field display may be used.

The memory 46 is a concept including a semiconductor memory such as a RAM, a ROM, and the like, and an external storage device such as a hard disk. The memory 46 stores a program 51 in which a control procedure of operations of the spectral reflectometer 1 and a calculation procedure of the distance measurement are described. In addition, the memory 46 stores measurement condition data 52 such as the intensity of the light 27 emitted by the first light emitting element 3, the second light emitting element 4, and the third light emitting element 5. The measurement condition data 52 includes data indicating the relationship between the voltage output to the filter unit 18 and the wavelength of the light 27 to be transmitted by the filter unit 18.

In addition, the memory 46 stores filter related data 53 which is the data related to the wavelength of the light 27 that the filter unit 18 passes. Besides, the memory 46 stores received light amount data 54 which is the data of the intensity of the light 27 detected by the light receiving unit 24. In addition, the memory 46 stores spectrum data 55 indicating the relationship between the wavelength of the light 27 that has passed through the filter unit 18 and the amount of the received light. Besides, the memory 46 has a work area for the CPU 45 to operate, a storage area functioning as a temporary file and the like, and other various storage areas.

The CPU 45 drives the sensor unit 26 according to the program 51 stored in the memory 46. Then, the CPU 45 calculates the spectrum of the light 27 reflected by the object 30 to be measured and displays the spectrum on the display device 48. The control unit 10 functions as a computer on which the input device 47, the display device 48, and the CPU 45 are mounted. The CPU 45 on which the program 51 operates includes a light source control unit 56 as a specific function realization unit. The light source control unit 56 controls the intensity of the light 27 emitted by the first light emitting element 3, the second light emitting element 4, and the third light emitting element 5 by using the measurement condition data 52.

In addition, the CPU 45 includes a filter control unit 57. The filter control unit 57 controls the wavelength of the light 27 passing through the filter unit 18. The filter control unit 57 sequentially changes the wavelength of the light 27 passing through the filter unit 18 within the wavelength range to be measured.

In addition, the CPU 45 includes a light receiving control unit 58. The light receiving control unit 58 controls the timing at which the light receiving unit 24 detects the intensity of the light 27. The light receiving control unit 58 outputs an instruction signal for causing the light receiving unit 24 to detect the intensity of the light 27 after the wavelength of the light 27 to be passed by the filter unit 18 is changed. Since the intensity of the light 27 is detected after the operation of the filter unit 18 is completed, the light receiving unit 24 may detect the intensity of the light 27 with good quality.

In addition, the CPU 45 includes a spectrum calculation unit 59. The spectrum calculation unit 59 combines the data of the wavelength of the light 27 passed by the filter unit 18 and the data of the intensity of the light 27 detected by the light receiving unit 24. Then, the spectrum calculation unit 59 calculates spectrum data 55 indicating the relationship of the intensity of the light 27 with respect to the wavelength.

In addition, the CPU 45 includes a display control unit 60. The display control unit 60 controls to display the wavelength of the light 27 to be passed by the filter unit 18 and the intensity of the light 27 detected by the light receiving unit 24 on the display device 48 in a tabular form. In addition, the display control unit 60 performs control to display the spectrum data 55 calculated by the spectrum calculation unit 59.

Next, the operation of the spectral reflectometer 1 will be described. The spectral reflectometer 1 measures a spectrum with a wavelength range of 400 nm to 700 nm. First, the light source control unit 56 drives the light source unit 14 to emit the light 27 from the first light emitting element 3, the second light emitting element 4, and the third light emitting element 5 to the object 30 to be measured. The intensity data of the light 27 emitted from the first light emitting element 3, the second light emitting element 4, and the third light emitting element 5 is set as a part of the measurement condition data 52 in advance so that the spectrum of the light 27 to be radiated on the object to be measured 30 is close to natural light. The light source control unit 56 drives the light source unit 14 by using the measurement condition data 52. As a result, it is possible to irradiate the object 30 to be measured with the light 27 close to natural light from the light source unit 14.

Next, the filter control unit 57 outputs an instruction signal for passing the light 27 of 400 nm to the filter unit 18. The filter unit 18 receives an instruction signal and adjusts the wavelength of the light 27 to be passed to 400 nm. Subsequently, the light receiving control unit 58 outputs an instruction signal for detecting the intensity of the light 27 to the light receiving unit 24. The light receiving unit 24 receives the instruction signal and detects the intensity of the light 27 radiated on the light receiving unit 24. Then, the data of the received light amount data 54 indicating the light intensity of the light 27 is sent to the CPU 45. The light receiving control unit 58 stores the received light amount data 54 indicating the light intensity and data indicating that the wavelength of the light 27 is 400 nm in the memory 46.

Next, the filter control unit 57 outputs an instruction signal for passing the light 27 of 405 nm to the filter unit 18. The filter unit 18 receives an instruction signal and adjusts the wavelength of the light 27 to be passed to 405 nm. Subsequently, the light receiving unit 24 detects the intensity of the light 27 radiated on the light receiving unit 24 and sends the data of the received light amount data 54 to the CPU 45. The light receiving control unit 58 stores the received light amount data 54 indicating the light intensity and data indicating that the wavelength of the light 27 is 405 nm in the memory 46.

Next, the filter control unit 57 outputs an instruction signal for lengthening the wavelength at which the light 27 passes through by 5 nm to the filter unit 18. Then, the light receiving unit 24 detects the intensity of the light 27, and the light receiving control unit 58 stores the received light amount data 54 indicating the light intensity in the memory 46.

As described above, the step of incrementing the wavelength by 5 nm at a time until the wavelength at which the light 27 passes is 700 nm, the step of detecting the intensity of the light 27 by the light receiving unit 24, and the step of storing the received light amount data 54 and the wavelength data of the light 27 in the memory 46 are repeated.

Next, the spectrum calculation unit 59 calculates the spectrum data 55. The spectrum calculation unit 59 plots the intensity of the light 27 detected by the light receiving unit 24 on the vertical axis with the horizontal axis representing the wavelength at which the light receiving unit 24 detects the intensity of light 27. The spectrum calculation unit 59 plots the intensity of the light 27 with respect to the wavelength of the light 27 from 400 nm to 700 nm and ends the calculation. Subsequently, the display control unit 60 displays the spectrum data 55 on the display device 48 and ends the measurement.

As described above, the embodiment has the following effects.

(1) According to the embodiment, the spectral reflectometer 1 is provided with the first substrate 7. Three types of light emitting elements 6 are installed on the first substrate 7. The height 3*b* of the first light emitting portion, the height 4*b* of the second light emitting portion, and the height 5*b* of the third light emitting portion which are the heights from the first substrate 7 to the respective light emitting portions in the three types of light emitting elements 6 are different. Further, the spectral reflectometer 1 is provided with the light receiver 25. The light 27 emitted from the light emitting element 6 is radiated on the object 30 to be measured, and the light receiver 25 receives the light 27 reflected by the object 30 to be measured.

The optical axis 21*a* of the light 27 to be received is set in the light receiver 25. Then, the light receiver 25 receives the light 27 incident along the optical axis 21*a*. The light emitting element 6 having a high height of the light emitting portion is installed at a position closer to the optical axis 21*a* of the light 27 received than the light emitting element 6 having a low height of the light emitting portion.

The light emitting element 6 having a high height of the light emitting portion is close to the object 30 to be measured. The light emitting portion of the light emitting element 6 having a high height of the light emitting portion is close to the optical axis 21a of the light receiver 25. In addition, the light emitting element 6 having a low height of the light emitting portion is separated from the object 30 to be measured. The light emitting portion of the light emitting element 6 having a low height of the light emitting portion is separated from the optical axis 21a of the light receiver 25. In this manner, in a case where light emitting elements 6 having different heights of the light emitting portions coexist, the angle formed by the straight line connecting the light emitting portion of three types of light emitting elements and the observation point 30a of the object 30 to be measured with the optical axis 21a of the light receiver 25 may be brought close to the same angle by making the distance between the optical axis 21a of each light receiver 25 and the light emitting portion of the light emitting element 6 different from each other. As a result, the spectral reflectometer 1 may radiate the light 27 with a high degree of accuracy of the angle of the light 27 radiated on the object 30 to be measured from the plurality of light emitting elements 6.

(2) According to this embodiment, the angles formed by the light 27 emitted from the three types of light emitting elements 6 traveling to the observation point 30a which is the object 30 to be measured on the optical axis 21a and the optical axis 21a of the light 27 received by the light receiver 25 are the same each other. At this time, when the light receiver 25 receives the light 27 radiated on the object 30 to be measured, the light 27 radiated from the three types of light emitting elements 6 may be received in the same reflection state.

(3) According to this embodiment, the angle formed by the light 27 emitted from the three types of light emitting elements 6 traveling to the observation point 30a which is the object 30 to be measured on the optical axis 21a and the optical axis 21a of the light 27 received by the light receiver 25 is 45 degrees. At this time, the light receiver 25 may receive the light 27 excluding the regular reflected component of the light 27 reflected by the object 30 to be measured.

(4) According to the embodiment, the spectral reflectometer 1 is provided with the light-transmissive protection portion 28 on the side from which the light emitting element 6 emits the light 27. Dust and moisture particles may float in the vicinity of the object 30 to be measured in some cases. At this time, the protection portion 28 may suppress dust and moisture particles adhering to the light emitting element 6 and the light receiver 25.

(5) According to the embodiment, the protection portion 28 is a filter that limits the wavelength of the light 27 to be passed. At this time, the protection portion 28 may suppress the light 27 other than the wavelength to be received by the light receiver 25 advancing to the light receiver 25.

(6) According to the embodiment, the protection portion 28 is detachably installed. Therefore, even when dust or moisture particles adhere to the protection portion 28, it is possible to remove the protection portion 28 from the spectral reflectometer 1 and wipe off the dust and moisture particles. Then, it is possible to reinstall the cleaned protection portion 28 in the spectral reflectometer 1.

(7) According to the embodiment, the spectral reflectometer 1 includes three types of light emitting elements 6 which emit light having different wavelength distributions. The wavelength distribution of the light 27 emitted from one type of light emitting element 6 is often limited in a wavelength range. Also at this time, it is possible to irradiate to the object 30 to be measured with the light 27 having a wavelength distribution close to natural light by irradiating the object to be measured with the light 27 from the three types of light emitting elements 6 having different wavelength distributions.

(8) According to the embodiment, the light receiver 25 is provided with a wavelength tunable Fabry-Perot etalon. The wavelength tunable Fabry-Perot etalon is a compact wavelength tunable filter. Therefore, even when the light receiver 25 receives light of a specific wavelength, it is possible to downsize the light receiver 25.

Second Embodiment

Next, an embodiment of the spectral reflectometer will be described with reference to a schematic side sectional view showing a structure of a spectral reflectometer of FIG. 9. The embodiment is different from the first embodiment in that a lens is provided between the light emitting element 6 and the observation point 30a. Descriptions of the same points as in the first embodiment will be omitted.

Figure 9:
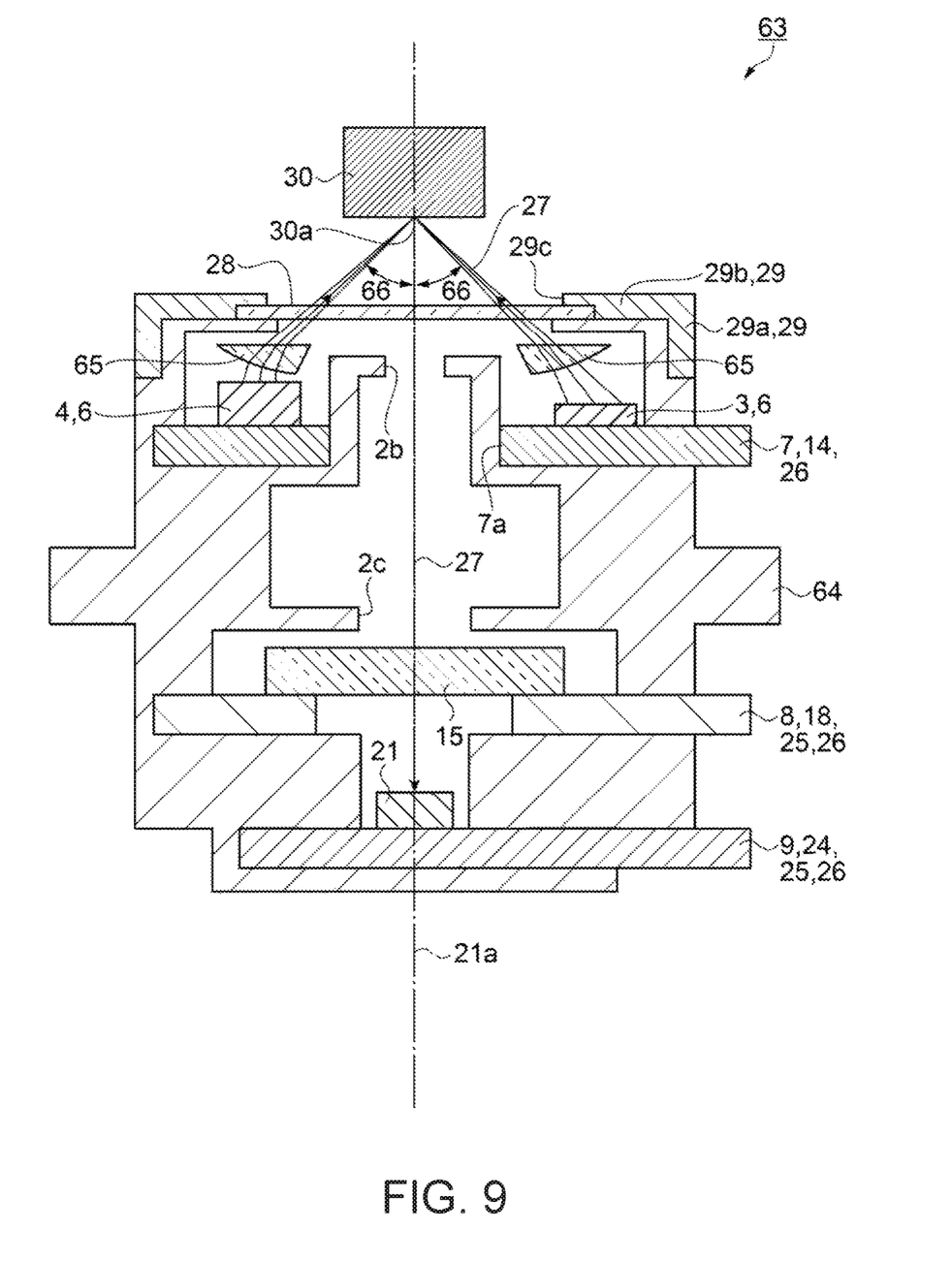
FIG. 9 is a schematic side sectional view showing a structure of a spectral reflectometer according to a second embodiment.

That is, in the embodiment, as shown in FIG. 9, the light source unit 14 is installed in a housing 64 of a spectral reflectometer 63. A lens 65 is installed at a position facing the light emitting element 6 between the light source unit 14 and the protection portion 28. The lens 65 is a convex lens. The light 27 emitted from the light emitting element 6 passes through the lens 65 and reaches the surface of the object 30 to be measured. Then, the lens 65 condenses the light 27 passing therethrough on the surface of the object 30 to be measured. Therefore, the lens 65 may efficiently condense and radiate the light 27 radiated by the light emitting element 6 on the object 30 to be measured.

On the first substrate 7, the light emitting elements 6 of the first light emitting element 3, the second light emitting element 4, and the third light emitting element 5 are installed. The light 27 emitted from each light emitting element 6 passes through the lens 65 and reaches the surface of the object 30 to be measured. An angle formed by the light 27 going from the lens 65 to the observation point 30a and the optical axis 21a is set as an irradiation angle 66. The irradiation angles 66 of the light 27 emitted from the first light emitting element 3, the second light emitting element 4, and the third light emitting element 5 are all the same angle at 45 degrees.

The lens 65 may be a convex lens between the light emitting element 6 and the observation point 30a. Therefore, the position through which the optical axis 21a passes may be formed with a hole or a flat plate.

As described above, the embodiment has the following effects. (1) According to the embodiment, the spectral reflectometer 63 is provided with the lens 65 at a position facing the light emitting element 6. The lens 65 may efficiently condense and radiate the light 27 radiated by the light emitting element 6 on the object 30 to be measured.

Third Embodiment

Figure 10:
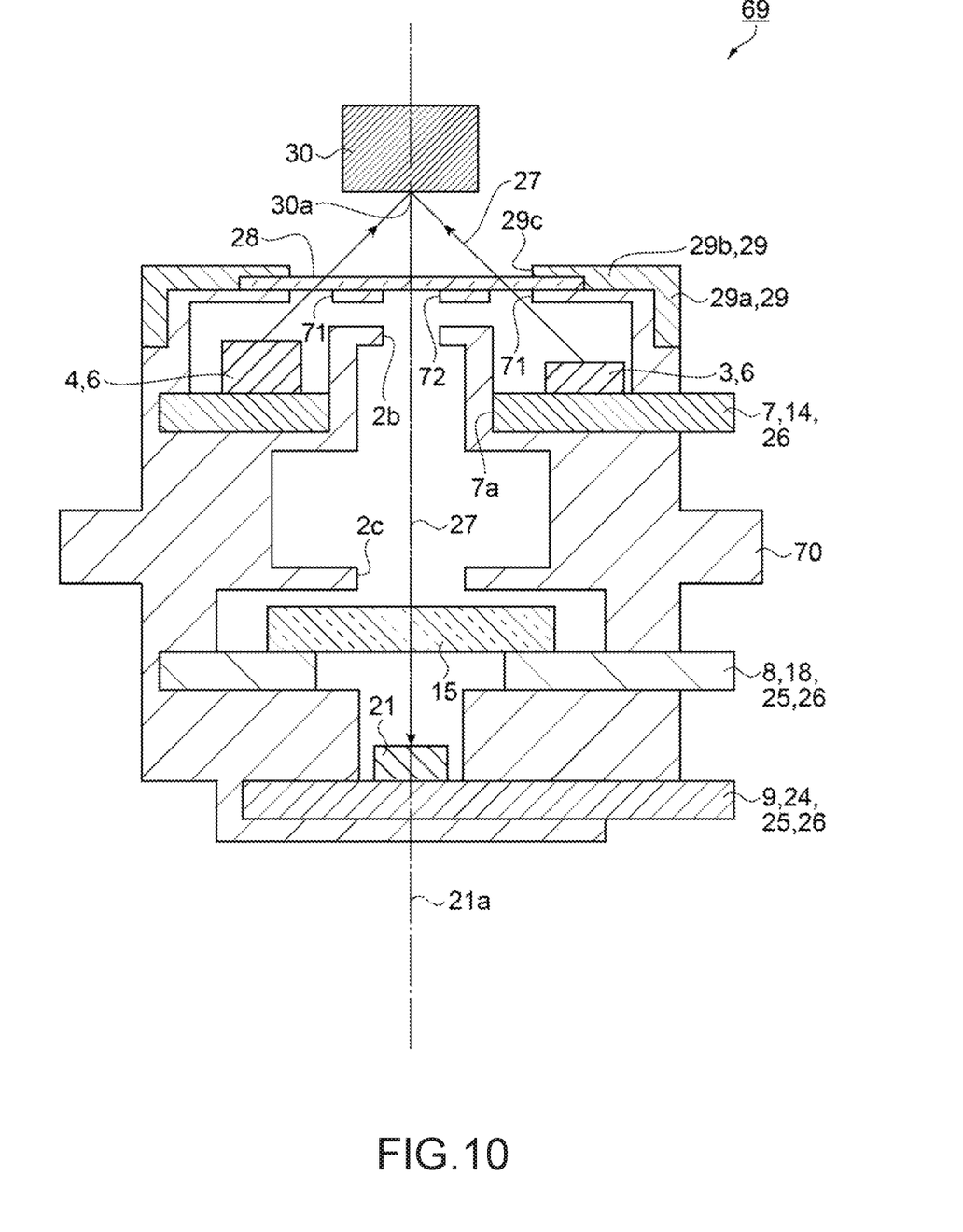
FIG. 10 is a schematic side sectional view showing a structure of a spectral reflectometer according to a third embodiment.
Figure 11:
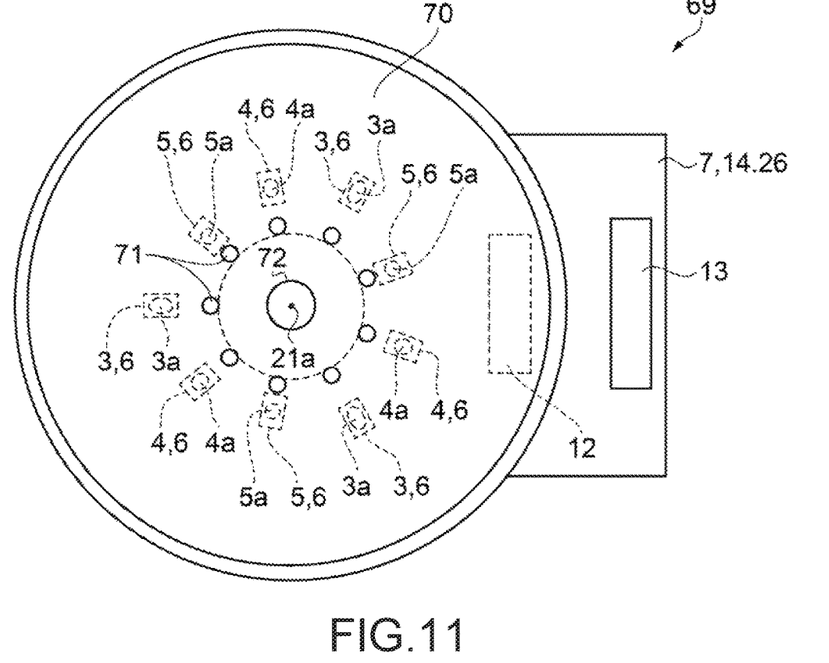
FIG. 11 is a schematic plan view showing a structure of a spectral reflectometer.

Next, an embodiment of the spectral reflectometer will be described with reference to FIGS. 10 to 11. FIG. 10 is a schematic side sectional view showing a structure of the spectral reflectometer. FIG. 11 is a schematic plan view showing the structure of the spectral reflectometer, in which the protection portion 28 and the support portion 29 are omitted. The embodiment is different from the first embodiment in that an opening portion is provided between the light emitting element 6 and the observation point 30a. Descriptions of the same points as in the first embodiment will be omitted.

That is, in the embodiment, as shown in FIG. 10, the light source unit 14 is installed in a housing 70 of a spectral reflectometer 69. Between the light source unit 14 and the protection portion 28, an opening portion 71 is installed between the light emitting element 6 and the object 30 to be measured on the optical axis 21a. The light 27 emitted from the light emitting element 6 passes through the opening portion 71 and reaches the surface of the object 30 to be measured. At this time, only the light 27 passing through the opening portion 71 is radiated on the object 30 to be measured. Therefore, it is possible to further limit the angle of the light 27 traveling from the light emitting portion of the light emitting element 6 to the object 30 to be measured.

The opening portion 71 is installed on the surface of the housing 70 on the side of the object 30 to be measured. A central opening portion 72 through which the optical axis 21a passes is also installed on the surface on the side of the object 30 to be measured in the housing 70. The light 27 emitted from the light emitting element 6 passes through the opening portion 71 and is radiated on the observation point 30a of the object 30 to be measured. Then, the light 27 reflected at the observation point 30a passes through the central opening portion 72 and is radiated onto the light receiving element 21.

As shown in FIG. 11, the opening portion 71 is substantially circular, and the same number as the number of the light emitting elements 6 is installed in nine pieces. The opening portion 71 is installed between each light emitting element 6 and the optical axis 21a.

As described above, the embodiment has the following effects. (1) According to the present embodiment, the spectral reflectometer 69 is provided with the opening portion 71 between the light emitting element 6 and the object 30 to be measured on the optical axis 21a. At this time, only the light 27 passing through the opening portion 71 is radiated on the object 30 to be measured. Therefore, it is possible to further limit the angle of the light 27 traveling from the light emitting portion of each light emitting element 6 to the object 30 to be measured.

The embodiment is not limited to the above-described embodiments, and various modifications and improvements may be made by those having ordinary knowledge in the art within the technical idea of the invention. Modification examples will be described below.

Modification Example 1

In the first embodiment, the first angle 34, the second angle 35, and the third angle 36 are 45 degrees. When the surface of the object 30 to be measured has few irregularities, the first angle 34, the second angle 35, and the third angle 36 are not limited to 45 degrees but may be 30 degrees or more and 60 degrees or less. At this time as well, it is possible to prevent the light receiving element 21 from receiving the regular reflected light 27.

Modification Example 2

In the first embodiment, the protection portion 28 is a filter that limits the wavelength of the light 27 to be passed. When the measurement is not affected even if the light 27 having a wavelength outside the measurement range passes through the protection portion 28, the protection portion 28 may be a transparent member. The wavelength of the light 27 to be passed by the protection portion 28 may not be limited. It is possible to manufacture the protection portion 28 with high productivity.

Modification Example 3

In the first embodiment, the protection portion 28 and the support portion 29 are detachably installed from the housing 2. When the housing 2 is easily detachable from a support member (not shown), the protection portion 28 and the support portion 29 may be fixed to the housing 2. That is, when the dust and moisture particles may be easily wiped off from the protection portion 28 without removing the protection portion 28 from the housing 2, the protection portion 28 and the support portion 29 may be fixed to the housing 2. It is possible to prevent dust from entering the interior of the housing 2 when the protection portion 28 and the support portion 29 are removed from the housing 2.

Modification Example 4

In the first embodiment, the three types of light emitting elements 6 having different spectra and emitting light to the light source unit 14 are installed. The type of the light emitting element 6 is not limited to three. One or two types may be used, or four or more types may be installed. The number of types of the light emitting element 6 may be adjusted according to the characteristics of the spectrum emitted by the light emitting element 6.

Modification Example 5

In the first embodiment, three light emitting elements 6 are provided for each type of light source unit 14. The number of the light emitting elements 6 is not limited to three. Each type may be two, or four or more may be installed. The number of types of the light emitting element 6 may be adjusted according to the characteristics of the directivity of light emitted from the light emitting element 6.

Modification Example 6

In the first embodiment, the light emitting element 6 is surface-mounted on the first substrate 7. The light emitting element 6 may be installed obliquely with respect to the first substrate 7. The light emitting element 6 may be installed on the first substrate 7 so that the light emitting element 6 emits the light 27 toward the observation point 30a. It is possible to irradiate the observation point 30a efficiently.

Modification Example 7

In the first embodiment, a silicon photodiode or a photo IC is used for the light receiving element 21. An area sensor may be used for the light receiving element 21. Then, a spectral camera that analyzes the distribution of colors in a predetermined range may be used.

Modification Example 8

Figure 12:
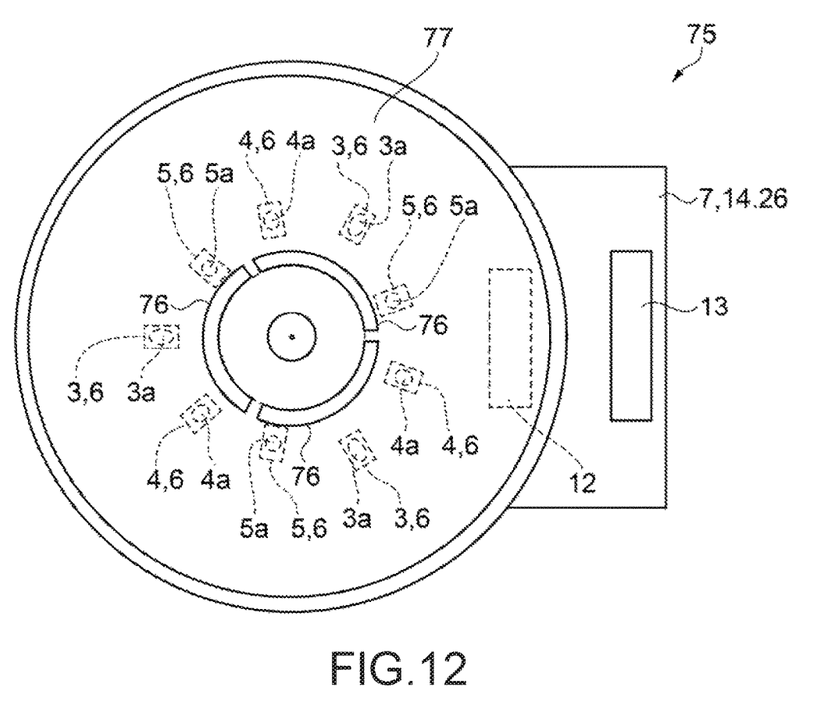
FIG. 12 is a schematic plan view showing a structure of a spectral reflectometer related to a modification example.

In the third embodiment, the opening portion 71 is substantially circular, and the same number as the number of the light emitting elements 6 is installed in nine pieces. FIG. 12 is a schematic plan view showing a structure of the spectral reflectometer. As shown in the spectral reflectometer 75 in FIG. 12, an arcuate opening portion 76 may be installed in a housing 77 instead of the opening portion 71. Between the light source unit 14 and the protection portion 28, the opening portion 76 is installed between the light emitting element 6 and the object 30 to be measured on the optical axis 21a. The light 27 emitted from the light emitting element 6 passes through the opening portion 76 and reaches the surface of the object 30 to be measured. At this time, only the light 27 passing through the opening portion 76 is radiated on the object 30 to be measured. Therefore, it is possible to further limit the angle of light traveling from the light emitting portion of the light emitting element 6 to the object 30 to be measured. In addition, since it is possible to reduce the number of the opening portions 76, it is easy to manufacture a mold for forming the housing 77.

Modification Example 9

The spectral reflectometer 1, the spectral reflectometer 63, the spectral reflectometer 69 and the spectral reflectometer 75 described in the above embodiments may be installed in a printer. It is possible to analyze the color printed by the printer by the spectral reflectometer 1, the spectral reflectometer 63, the spectral reflectometer 69 or the spectral reflectometer 75. The spectral reflectometer 1, the spectral reflectometer 63, the spectral reflectometer 69, and the spectral reflectometer 75 may be installed on a carriage for moving a printer head. It is possible to analyze the color printed just after the printer prints.

The entire disclosure of Japanese Patent Application No. 2017-228720 filed on Nov. 29, 2017 is expressly incorporated by reference herein.

What is claimed is:

1. A spectral reflectometer comprising:
a substrate;
a plurality of light emitters that are installed on the substrate, each light emitter having a light emitting portion; and
a light receiver that receives light,
wherein the plurality of light emitters have different wavelength distributions, and
wherein the light emitting portion of a first one of the light emitters is further in height from the substrate than the light emitting portion of a second one of the light emitters, and the first one of the light emitters is installed at a position closer to an optical axis of the light received by the light receiver than the second one of the light emitters.

2. The spectral reflectometer according to claim 1, wherein angles formed by light traveling from the light emitting portions to an object to be measured, which is on the optical axis of light received by the light receiver, are the same as each other.

3. The spectral reflectometer according to claim 2, wherein an angle formed by light traveling from the light emitting portions to the object to be measured on the optical axis and the optical axis is 45 degrees.

4. The spectral reflectometer according to claim 2, wherein an opening is provided between the light emitters and the object to be measured on the optical axis.

5. The spectral reflectometer according to claim 4, wherein a light-transmissive filter entirely covers the opening.

6. The spectral reflectometer according to claim 5, wherein the filter limits a wavelength of the light that may pass therethrough.

7. The spectral reflectometer according to claim 5, wherein the filter is detachably installed.

8. The spectral reflectometer according to claim 1, wherein a lens is provided at a position facing the light emitters.

9. The spectral reflectometer according to claim 1, wherein the plurality of light emitters include a white light emitter, an ultraviolet light emitter, and a blue light emitter.

10. The spectral reflectometer according to claim 1, wherein the light receiver includes a wavelength tunable Fabry-Perot etalon.

* * * * *